United States Patent
Ballagh et al.

(10) Patent No.: US 8,082,139 B1
(45) Date of Patent: Dec. 20, 2011

(54) DISPLAYING SIGNALS OF A DESIGN BLOCK EMULATED IN HARDWARE CO-SIMULATION

(75) Inventors: Jonathan B. Ballagh, Boulder, CO (US); Michael D. Hirsch, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 757 days.

(21) Appl. No.: 11/729,400

(22) Filed: Mar. 27, 2007

(51) Int. Cl.
*G06F 17/50* (2006.01)

(52) U.S. Cl. ............... 703/14; 703/13; 703/20; 703/23; 702/4; 702/5; 702/8; 716/119; 716/123; 716/127

(58) Field of Classification Search .................. 703/20, 703/13, 7, 23; 716/8; 717/124
See application file for complete search history.

(56) References Cited

U.S. PATENT DOCUMENTS

| | | | | |
|---|---|---|---|---|
| 5,197,016 | A * | 3/1993 | Sugimoto et al. | 716/8 |
| 6,152,612 | A * | 11/2000 | Liao et al. | 703/23 |
| 7,509,244 | B1 * | 3/2009 | Shakeri et al. | 703/7 |
| 2002/0059054 | A1 * | 5/2002 | Bade et al. | 703/20 |
| 2006/0117274 | A1 * | 6/2006 | Tseng et al. | 716/1 |
| 2006/0195822 | A1 * | 8/2006 | Beardslee et al. | 717/124 |
| 2009/0150136 | A1 * | 6/2009 | Yang | 703/13 |

OTHER PUBLICATIONS

Cadence datasheet, Signal Processing Workstation with Convergence Simulation Architecture 1997.*
Xilinx, Inc., *Xilinx System Generator for DSP*, Version 8.1, Apr. 25, 2006, pp. 196-210, Xilinx, Inc., San Jose, California, USA.
Xilinx, Inc., *Xilinx System Generator for DSP*, Version 9.1, Feb. 16, 2007, pp. 133-241, Xilinx, Inc., San Jose, California, USA.

* cited by examiner

*Primary Examiner* — Kamini S Shah
*Assistant Examiner* — Cuong Luu
(74) *Attorney, Agent, or Firm* — LeRoy D. Maunu; Lois D. Cartier (57) ABSTRACT

Methods and systems for simulating an electronic system in a high level modeling system (HLMS). A design block and certain signals of the electronic system are selected. The selected signals include internal signals of the design block that are not ports of the design block. The electronic system is simulated in the HLMS, which includes a hardware-based co-simulation platform and a software-based co-simulation platform. A hardware realization of the design block is automatically generated and the design block is emulated in the hardware based co-simulation platform using the hardware realization of the design block. A sequence of values is displayed for the selected signals of the electronic system. During the simulation of the electronic system in the HLMS, the sequence of values for the internal signals of the design block and another sequence of values for the ports of the design block are transferred between the co-simulation platforms.

17 Claims, 5 Drawing Sheets

DISPLAYING SIGNALS OF A DESIGN BLOCK EMULATED IN HARDWARE CO-SIMULATION

FIELD OF THE INVENTION

The present invention generally relates to simulation of electronic systems, and more particularly to hardware co-simulation of electronic systems.

BACKGROUND

During the process of developing an electronic system, the behavior of the electronic system may be simulated based on a specification of the design of the electronic system. Simulating the electronic system helps to verify correct behavior prior to physical implementation of a circuit for the electronic system. Wasted manufacturing costs due to faulty design may thereby be avoided.

Numerous tools are available for simulating electronic systems including, for example, high-level modeling systems (HLMSs). Co-simulation may also be used when the design may be more efficiently simulated by simulating different parts of the design on different simulation platforms ("co-simulation platforms").

Example co-simulation platforms include both software-based and hardware-based platforms. In a software-based platform, a portion of the design is simulated with software running on a workstation, for example. In a hardware-based platform, a portion of the design is emulated on a hardware platform that includes a programmable logic device (PLD), such as a field programmable gate array (FPGA). Co-simulation using a hardware platform may reduce the time required for a simulation run. The Modelsim simulator and the NC-SIM simulator from Cadence are example software-based platforms, and the Wildcard development platform from Annapolis Microsystems and the Benone development platform from Nallatech are example hardware-based platforms. The WildCard and Benone platforms are often used for algorithm exploration and design prototyping.

Most design tools recognize and support a hierarchical specification of the design, which allows the design to be specified and viewed at different levels of abstraction. The term "block" is sometimes used to refer to a collection of parts of a design that perform a function. Blocks consume inputs and produce outputs as a function of internal state, blocks are connected by arcs, and arcs conduct data between blocks. At some level in this hierarchical framework, simulating the design involves moving data from one block of the design to another block of the design.

An HLMS, such as System Generator for DSP (Sysgen) HLMS, may permit a block of a design for an electronic system to be translated into PLD configuration data that may be used to configure a hardware-based co-simulation platform. The HLMS software may include a "hardware co-simulation block" as a proxy for the hardware based co-simulation platform. Like other blocks of the electronic system, the hardware co-simulation block consumes inputs and produces outputs. The hardware co-simulation block transfers the inputs for the block from the HLMS software to the hardware-based co-simulation platform and transfers the outputs of the block from the hardware-based co-simulation platform to the HLMS software.

Emulating a design block on a hardware-based co-simulation platform may reduce the time required for a simulation run for the electronic system. However, verifying correct behavior of the electronic system may be time-consuming because the encapsulation of the design block in the hardware-based co-simulation platform may prevent accessing the internal signals of the design block.

The present invention may address one or more of the above issues.

SUMMARY OF THE INVENTION

Various embodiments of the invention provide a method of simulating an electronic system in a high level modeling system (HLMS). A design block and certain signals of the electronic system are selected. The selected signals include one or more internal signals of the design block that are not ports of the design block. The electronic system is simulated in the HLMS, which includes a hardware-based co-simulation platform and a software-based co-simulation platform. A hardware realization of the design block is automatically generated and the design block is emulated in the hardware-based co-simulation platform using the hardware realization of the design block. A sequence of values is displayed for the selected signals of the electronic system. During the simulation of the electronic system in the HLMS, the sequence of values for the internal signals of the design block and another sequence of values for the ports of the design block are transferred between the co-simulation platforms.

Various other embodiments of the invention provide a high-level modeling system (HLMS) for simulating an electronic system. The HLMS includes a hardware-based co-simulation platform and a software-based co-simulation platform. The hardware-based co-simulation platform includes a programmable logic device configurable to emulate a design block of the electronic system using a hardware realization of the design block. The software-based co-simulation platform includes at least one processor adapted to perform certain operations. These operations include selecting the design block and certain signals of the electronic system. The selected signals include one or more internal signals of the design block that are not ports of the design block. The operations also include automatically generating the hardware realization of the design block and simulating the electronic system excluding the design block. During the simulation, a sequence of values for the internal signals of the design block and another sequence of values for the ports of the design block are transferred between the co-simulation platforms. The operations further include displaying the values of the signals of the electronic system, including displaying the sequence of values for the internal signals of the design block.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
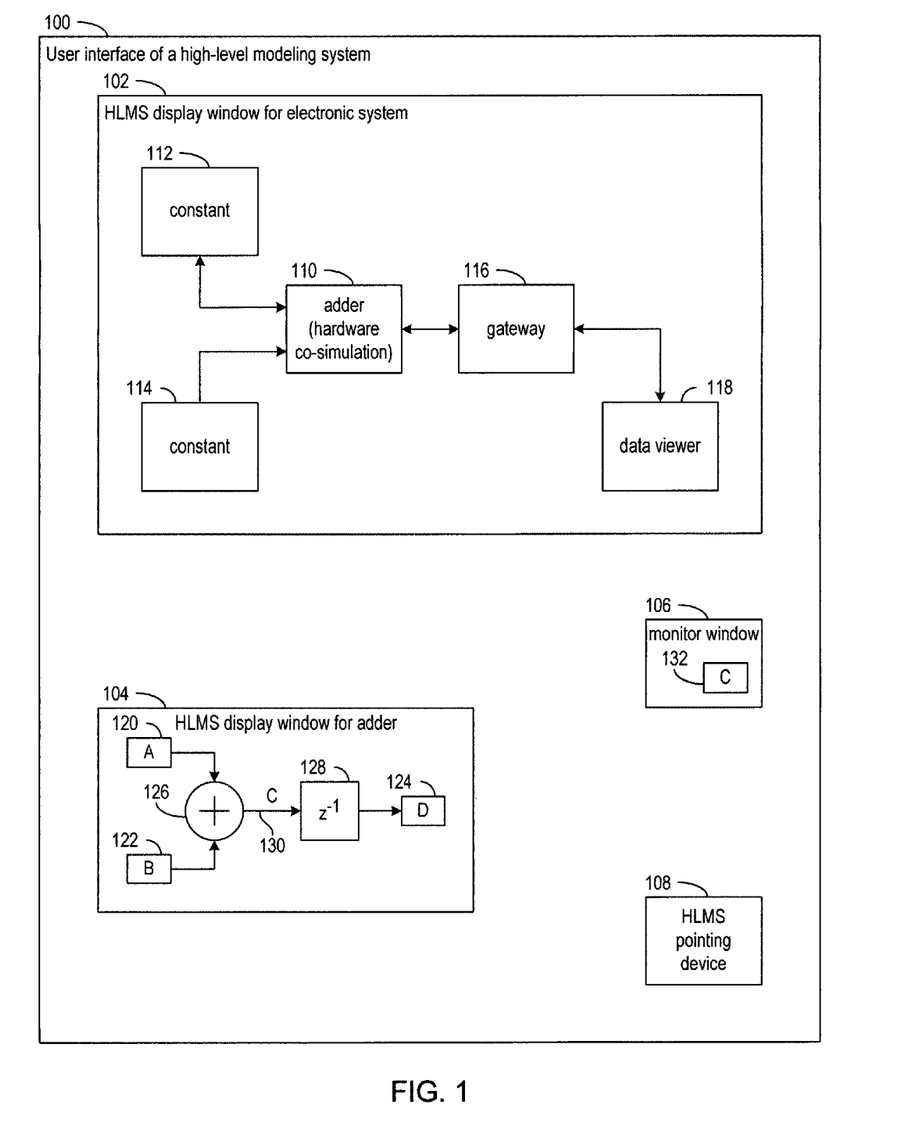
FIG. 1 is a block diagram of a user interface of a high-level modeling system for an example electronic system in accordance with various embodiments of the invention.

FIG. 1 is a block diagram of a user interface 100 of a high-level modeling system (HLMS) for an example electronic system in accordance with various embodiments of the invention. The user interface 100 may have one or more displays that display windows 102, 104, and 106 for illustrating various aspects of the example electronic system. The user interface 100 may also include a pointing device 108, such as a mouse, for manipulating the various aspects of the example electronic system illustrated by windows 102, 104, and 106.

A top level of a hierarchy for the example electronic system may be shown by window 102. The example electronic system may include an adder 110 that adds the values from constant generators 112 and 114. Gateway 116 may convert data types between a fixed-point data type produced by adder 110 and a floating-point data type expected by data viewer 118. Adder 110 may use a fixed-point data type, which may have a precision that is selectable by a user of the HLMS, to provide an efficient hardware implementation of the adder 110.

A user of the HLMS may use the pointing device 108 to select, for example, the adder 110 in the window 102. The HLMS may have capabilities of performing various operations on a user selection. An example operation is opening the window 104 for showing another level of hierarchy of the example electronic system within the adder 110. The adder 110 may include input ports 120 and 122, output port 124, addition block 126, and register block 128, as shown by window 104. It will be appreciated that various components, such as addition block 126, may be selectable for various operations including opening additional windows showing corresponding additional levels of the hierarchy of the example electronic system.

In various embodiments of the invention, the pointing device 108 may be used to select the adder 110 for hardware co-simulation and to select the internal signal on line 130 of the adder 110 for monitoring. The example electronic system may be simulated on hardware and software co-simulation platforms, with the adder 110 simulated on the hardware co-simulation platform and constant generators 112 and 114, gateway 116, and data viewer 118 simulated on the software co-simulation platform. During the co-simulation of the example electronic system, a time sequence of values may be created for internal signal on line 130 and for any other signals selected for monitoring. The sequences of values 132 for the monitored signals may be displayed by monitor window 106 of the HLMS.

The example electronic system may be created in the HLMS using user interface 100. A user of the HLMS may create adder 110 by selecting blocks 126 and 128 from a library (not shown) and interconnecting these blocks and ports 120, 122, and 124. The creation of adder 110 may create an icon in a user library that represents the adder 110, and this icon may be selected from the library and interconnected with constant generators 112 and 114, gateway 116 and data viewer 118 to create the electronic system shown in window 102.

In one embodiment, a user of the HLMS may designate the adder 110 for hardware co-simulation on a hardware co-simulation platform, causing a hardware realization of the adder 110 to be generated along with a co-simulation block in a user library. To complete the selection of adder 110 for hardware co-simulation, the user may replace the adder 110 in window 102 with the co-simulation block that represents the hardware realization of the adder 110.

Figure 2:
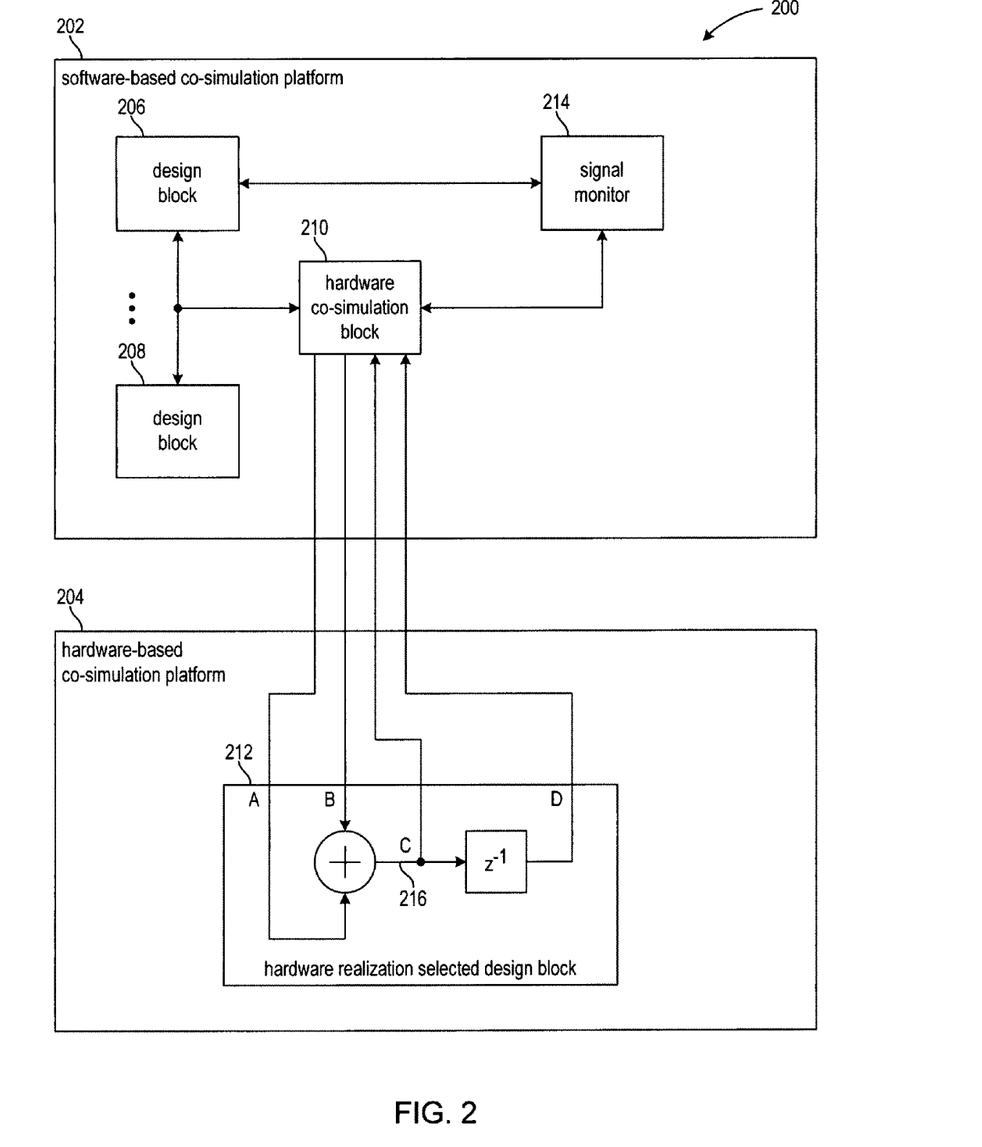
FIG. 2 is a block diagram of a high-level modeling system including hardware-based and software-based co-simulation platforms in accordance with various embodiments of the invention.

FIG. 2 is a block diagram of a high-level modeling system 200 including software-based and hardware-based co-simulation platforms 202 and 204 in accordance with various embodiments of the invention. The software co-simulation platform 202 may execute software that includes routines for simulating an electronic system. A specific portion of the electronic system, such as a particular design block in the hierarchy of the electronic system, may be selected for emulation on the hardware co-simulation platform 204. Thus, the simulation of an electronic system may be split into an emulation of a design block on the hardware co-simulation platform 204 and a simulation of the electronic system excluding the design block on a software co-simulation platform 202.

The electronic system may include design blocks 206 and 208 that are interconnected together with a hardware co-simulation block 210. Hardware co-simulation block 210 is a proxy within the software co-simulation platform 202 for the hardware realization 212 of another design block. The hardware co-simulation block 210 may be externally indistinguishable from the design block selected for hardware co-simulation because the hardware co-simulation block 210 may have the same ports as the selected design block.

The hardware co-simulation block 210 may collect values for the inputs of the design block selected for hardware co-simulation, and send these input values to hardware realization 212 of the selected design block in the hardware co-simulation platform 204. From these input values, the hardware realization 212 may generate values for the outputs of the selected design block. The hardware co-simulation block 210 may read these generated values from the hardware co-simulation platform 204 and convey these values to the design blocks 206 and 208 and/or the signal monitor 214.

Selecting a design block of an electronic system for hardware co-simulation may increase the speed of simulating the electronic system because emulating a design block on a hardware co-simulation platform 204 is generally faster than simulating a design block in software. However, while a design block 206 simulated in software generally provides access by signal monitor 214 to internal signals of design block 206, previous simulation methods have a hardware realization of a design block that does not provide access to internal signals of the design block selected for hardware co-simulation. Thus, the advantage of simulation speed for hardware co-simulation may be offset in previous simulation methods by a lack of visibility for internal signals of the design block selected for hardware co-simulation. In contrast, various embodiments of the invention assist efficient verification of an electronic system by providing faster simulation speed through hardware co-simulation along with monitoring of selected internal signals of the design block that is selected for co-simulation.

In various embodiments of the invention, the ports the hardware co-simulation block 210 may include ports corresponding to the ports of the selected design block and may effectively include extra ports for the internal signals that are selected for monitoring within the selected design block. These extra ports may be connected to a signal monitor 214 in the software co-simulation platform 202, and the signal monitor 214 may display of values of the internal signals, such the internal signal on line 216, received from the hardware realization 212 of the design block via these extra ports of the hardware co-simulation block 210. The signal monitor 214 may also be connected to design block 206 for monitoring ports and/or internal signals of design block 206. It will be appreciated that a user interface of the HLMS may not show the extra ports of the hardware co-simulation block 210, and also may not show the connections from the signal monitor 214 to these extra ports and the other design blocks 206 and/or 208.

In one embodiment, each extra port is connected to a software signal, such as an XSignal of the Sysgen HLMS available from Xilinx Inc., similar to the software signals used to communicate between design blocks 206 and 208. The signal monitor 214 may be WaveScope of the Sysgen HLMS and WaveScope may place a DataListener block on an XSignal to monitor and record the sequence of values for the XSignal. After simulation, WaveScope may present these sequences of values in a graphical manner on a display.

Figure 3:
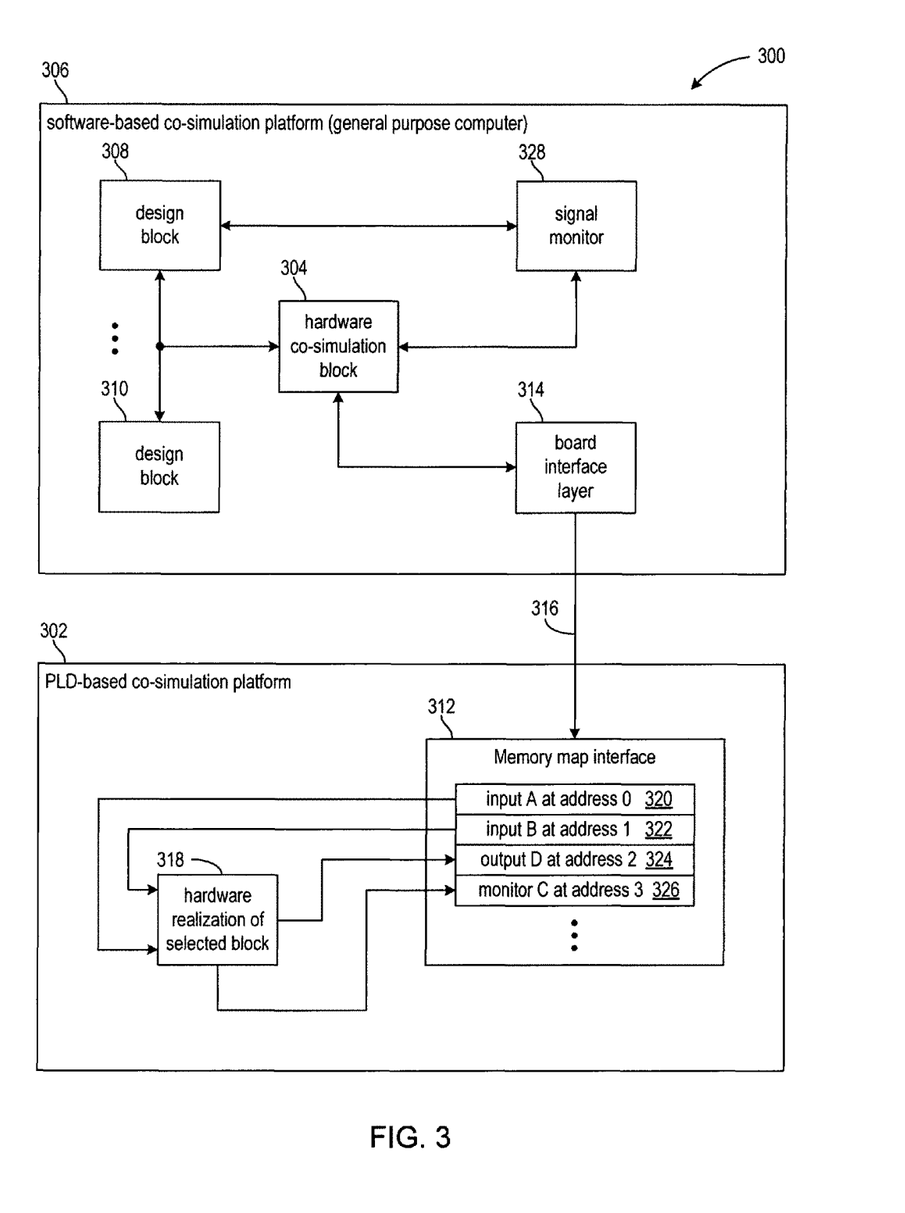
FIG. 3 is a block diagram of a high-level modeling system including a programmable logic device (PLD) in accordance with various embodiments of the invention.

FIG. 3 is a block diagram of a high-level modeling system 300 including a programmable logic device (PLD) in a hardware co-simulation platform 302 in accordance with various embodiments of the invention. A design block of an electronic system may be selected for hardware co-simulation and a hardware co-simulation block 304 may represent the selected design block within the software co-simulation platform 306. Certain internal signals of the selected design block may additionally be selected to be monitored during co-simulation of the electronic system.

The hardware co-simulation block 304 may receive input values for the input ports of the selected block from design blocks 308 and 310 and provide output values for the output ports of the selected design block to design blocks 308 and 310. The hardware co-simulation block 304 writes the input values to the memory map 312 via board interface layer 314 and reads the output values from the memory map 312 via board interface layer 314.

The software for the hardware co-simulation block 304 may communicate with the board interface layer 314 using an interface that parallels the memory map 312. The platforms 306 and 302 may communicate using a link on line 316 that may be, for example, Ethernet, Peripheral Component Interconnect (PCI), Universal Serial Bus (USB), or Joint Test Action Group (JTAG). In one embodiment, the software co-simulation platform 306 is a general purpose computer that communicates with hardware co-simulation platform 302 through an input/output interface of the general purpose computer. The board interface layer 314 may be driver software that redirects communications from the hardware co-simulation block 304 to access the memory map 312 using the specific communication link on line 316 between platforms 306 and 302. The board interface layer 314 may be customized to match a type of the software-based co-simulation platform 302 and its supported communication protocols. Thus, any changes needed to support a new hardware co-simulation platform may be localized to the board interface layer 314, such that the hardware co-simulation block 304 may remain unmodified.

The programmable logic and interconnect resources of the PLD of the co-simulation platform 302 may be configured with configuration data to implement the memory map interface 312 and the hardware realization 318 of the design block selected for hardware co-simulation. Thus, the configuration data may include a specification of the hardware realization 318 of the design block and a specification of the memory map interface 312.

In one embodiment, the software co-simulation platform 306 may generate the configuration data from the selected design block and its internal signals that are selected for monitoring. During generation of the configuration data, the signal monitor 328 may be queried to determine the signals currently selected for monitoring that are also internal signals of the selected design block. Because the available programmable logic and interconnect resources in the PLD may vary with the type of the PLD in the hardware co-simulation platform 302, the type of the PLD and/or the type of the hardware co-simulation platform 302 may need to be specified before generating configuration data that is targeted to the hardware co-simulation platform 302. In addition, the software co-simulation platform 306 may direct the actual configuration of the PLD in the hardware co-simulation platform 302 with the configuration data transferred to the PLD via communication link on line 316 or another communication link.

The memory map 312 may include a set of addressable locations 320 through 326 that may be sequential addressable locations. The input ports of the selected design block may have a corresponding location or locations 320 and 322 in the memory map 312 and the output ports of the selected design block may have a corresponding location 324 or locations in the memory map 312. Input values for the input ports may be written by hardware co-simulation block 304 to locations 320 and 322, and these values may be supplied from locations 320 and 322 to inputs of the hardware realization 318. The hardware realization 318 may generate output values that are supplied to location 324 of memory map 312, and the output values may be read from location 324 by hardware co-simulation block 304.

In various embodiments of the invention, the memory map 312 may also include a location 326 or locations for selected internal signals of the hardware realization 318, and the hardware realization 318 may be arranged to provide monitored values for each selected internal signal to the corresponding location 326. The hardware co-simulation block 304 may read the monitored values from the corresponding location 326 for each selected internal signal and to provide these monitored values to the signal monitor 328, such as WaveScope of the Sysgen HLMS available from Xilinx, Inc. The signal monitor 328 may display a sequence of the monitored values on a user interface of the HLMS.

Figure 4:
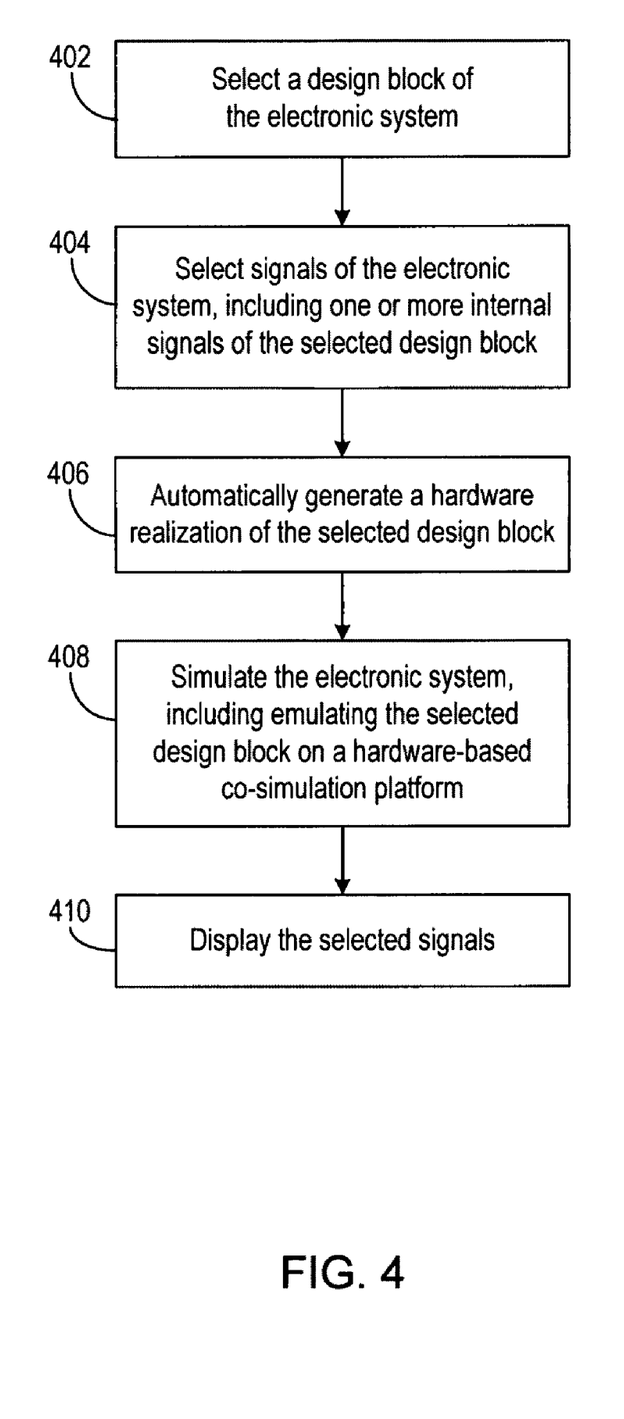
FIG. 4 is a flow diagram of a process for simulating an electronic system in accordance with various embodiments of the invention.

FIG. 4 is a flow diagram of a process for simulating an electronic system in accordance with various embodiments of the invention. The electronic system is simulated using a co-simulation that splits the simulation between at least two co-simulation platforms including a software co-simulation platform and a hardware co-simulation platform.

At step 402, one of the design blocks of an electronic system is selected for hardware co-simulation. It will be appreciated that the selected design block may be the entire electronic system and the multiple design blocks may be selected for hardware co-simulation on one or more hardware co-simulation platforms. At step 404, certain signals of the electronic system are selected. For example, the selected signals may be the signals that are needed to determine the cause of a defect in the electronic system. The signals may be selected using a pointing device from a window illustrating a level of the hierarchy of the electronic system or a window providing a hierarchical listing of the signals of the electronic system. One or more of the selected signals is an internal signal of the design block selected at step 402 for hardware co-simulation.

At step 406, a hardware realization is automatically generated for the design block selected at step 402. The hardware realization may specify a configuration of a subset of the programmable logic and routing resources of a PLD, such that the subset of programmable resources may implement the selected design block after configuring the PLD with configuration data including the hardware realization.

At step 408, the electronic system is simulated using a co-simulation that emulates the selected design block on a hardware co-simulation platform. The rest of the electronic system may be simulated on a software co-simulation platform. The software co-simulation platform may coordinate the emulation of the selected design block with the simulation of the electronic system excluding the selected design block on the software co-simulation platform. The simulation of the electronic system may generate a sequence of values for each signal of the electronic system. At step 410, the sequence of values is displayed for each signal selected at step 404, including one or more internal signals of the design block selected at step 402.

Figure 5:
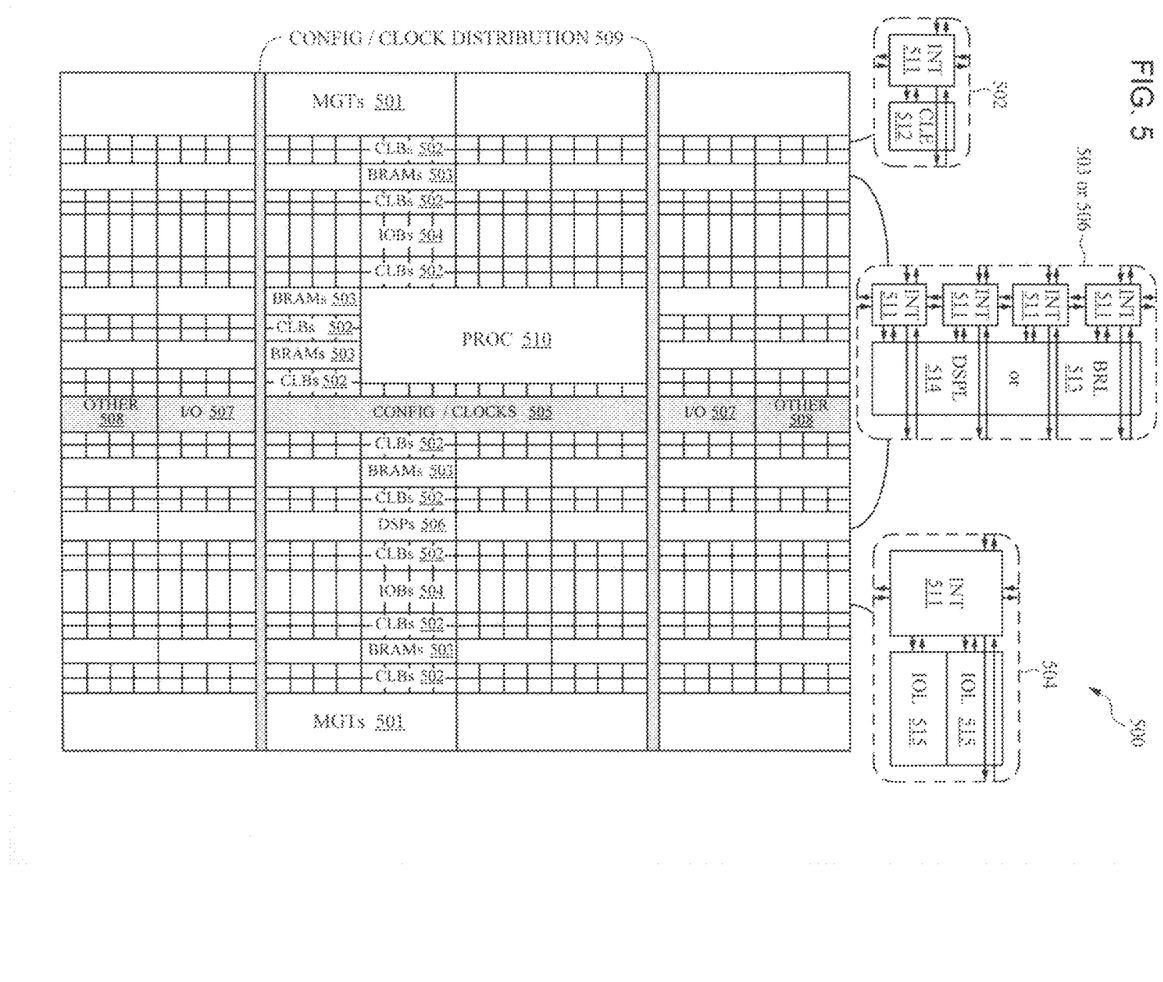
FIG. 5 is a block diagram of a programmable logic device that may be used for hardware co-simulation in accordance with various embodiments of the invention.

FIG. 5 is a block diagram of a programmable logic device that may be used for hardware co-simulation in accordance with various embodiments of the invention. A PLD can include several different types of programmable logic blocks that are arranged in the array. For example, FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., clock ports and configuration ports for loading configuration data into the FPGA), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for simulating an electronic system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of simulating an electronic system in a high level modeling system (HLMS), the method comprising:
    selecting a design block of the electronic system;
    selecting a plurality of signals of the electronic system, the signals including at least one internal signal of the design block that is not a member of a plurality of ports of the design block;
    wherein the selecting of the design block includes generating a co-simulation block for the design block and replacing the design block in the HLMS with the co-simulation block;
    creating a respective extra port on the selected design block for each of the at least one internal signal in response to the selecting of the at least one internal signal;
    automatically generating a hardware realization of the design block;
    wherein the hardware realization of the design block includes each respective extra port and the plurality of ports of the design block;
    mapping each extra port and each of the ports of the design block to corresponding locations in a memory in a hardware-based co-simulation platform, wherein the memory is external to the hardware realization of the design block;
    connecting the memory location corresponding to each respective extra port and each of the ports of the design block to a signal monitor on a software-based co-simulation platform via a software signal;
    simulating the electronic system in the HLMS, which includes the hardware-based co-simulation platform and the software-based co-simulation platform, wherein the simulating of the electronic system includes emulating the design block in the hardware-based co-simulation platform using the hardware realization of the design block;

wherein the co-simulation block is included in the software based co-simulation platform;

wherein the simulating further includes:
  writing by the hardware realization of the design block, a respective first sequence of values to a corresponding location in the memory and a respective second sequence of values to a corresponding location in the memory, the respective first sequence of values representative of the at least one internal signal, and the respective second sequence of values representative of a signal of a port of the design block;
  reading by the co-simulation block the respective first sequence of values from the corresponding locations in the memory; and
  displaying the respective first sequence of values by the signal monitor.

2. The method of claim 1, further comprising creating the electronic system in the HLMS.

3. The method of claim 1, wherein the selecting the signals includes selecting a subset of a plurality of signals of the electronic system using a pointing device of a user interface of the HLMS.

4. The method of claim 1, wherein the automatically generating of the hardware realization of the design block includes automatically generating the hardware realization of the design block in response to the selecting of the design block and the selecting of the signals.

5. The method of claim 4, further comprising specifying a type of the hardware-based co-simulation platform, wherein the automatically generating of the hardware realization of the design block includes targeting to the type of the hardware-based co-simulation platform.

6. The method of claim 1, wherein the simulating of the electronic system in the HLMS further includes simulating at least one other design block of the electronic system on the software-based co-simulation platform.

7. The method of claim 1, wherein the emulating of the design block includes configuring a programmable logic device of the hardware-based co-simulation platform with configuration data including the hardware realization of the design block.

8. The method of claim 1, wherein the transferring of the respective first sequence of values for the at least one internal signal of the design block includes transferring the respective first sequence of values for the at least one internal signal of the design block from the hardware-based co-simulation platform to the software-based co-simulation platform.

9. The method of claim 1, wherein the transferring includes transferring the respective first sequence of values for the at least one internal signal of the design block and the second sequences of values between the hardware-based co-simulation platform and a board interface layer of the software-based co-simulation platform that is customized for a type of the hardware-based co-simulation platform.

10. The method of claim 1, wherein the transferring includes the software-based co-simulation platform controlling the transferring between the hardware-based and the software-based co-simulation platforms of the respective first sequence of values for the at least one internal signal of the design block and the second sequences of values.

11. The method of claim 1, wherein the design block is all of the electronic system.

12. The method of claim 1, wherein the emulating of the design block includes configuring a programmable logic device of the hardware-based co-simulation platform with configuration data including the hardware realization of the design block.

13. A high-level modeling system (HLMS) for simulating an electronic system, the HMLS comprising:
  a hardware-based co-simulation platform including a programmable logic device configurable to emulate a design block of the electronic system using a hardware realization of the design block; and
  a software-based co-simulation platform coupled to the hardware-based co-simulation platform and including at least one processor adapted to perform operations including:
    selecting the design block of the electronic system,
    selecting a plurality of signals of the electronic system, the signals including at least one internal signal of the design block that is not a member of a plurality of ports of the design block;
    wherein the selecting of the design block includes generating a co-simulation block for the design block and replacing the design block in the HLMS with the co-simulation block;
    wherein the co-simulation block is included in the software based co-simulation platform;
    creating a respective extra port on the selected design block for each of the at least one internal signal in response to the selecting of the at least one internal signal;
    automatically generating the hardware realization of the design block,
    wherein the hardware realization of the design block includes each respective extra port and the plurality of ports of the design block;
    mapping each extra port and each of the ports of the design block to corresponding locations in a memory of the hardware-based co-simulation platform, wherein the memory is external to the hardware realization of the design block;
    connecting the memory location corresponding to each respective extra port and each of the ports of the design block to a signal monitor on the software-based co-simulation platform via a software signal;
  simulating the electronic system excluding the design block, wherein the simulating includes transferring between the hardware-based co-simulation platform and the signal monitor a respective sequence of values for the at least one internal signal and the ports of the design block;
  wherein the simulating further includes:
    writing by the hardware realization of the design block, a respective first sequence of values to a corresponding location in the memory and a respective second sequence of values to a corresponding location in the memory, the respective first sequence of values representative of the at least one internal signal, and the respective second sequence of values representative of a signal of a port of the design block;
    reading by the co-simulation block the respective first sequence of values from the corresponding locations in the memory; and
    displaying the respective first sequence of values.

14. The HLMS of claim 13, wherein the at least one processor is adapted to perform the operations further including configuring the programmable logic device of the hardware-based co-simulation platform with configuration data including the hardware realization of the design block.

15. The HLMS of claim 13, wherein the simulating of the electronic system excluding the design block by the at least one processor includes coordinating an emulation of the design block by the hardware-based co-simulation platform and the simulating of the electronic system excluding the design block.

16. The HLMS of claim 13, wherein the selecting of the design block by the at least one processor includes selecting the design block using a pointing device of the HLMS and the selecting of the signals by the at least one processor includes selecting the signals using the pointing device.

17. A high-level modeling system (HLMS) for simulating an electronic system, the HMLS comprising:
  means for selecting a design block of the electronic system;
  means for selecting a plurality of signals of the electronic system, the signals including at least one internal signal of the design block that is not a member of a plurality of ports of the design block;
  wherein the means for selecting the design block includes means for generating a co-simulation block for the design block and for replacing the design block in the HLMS with the co-simulation block;
  means for creating a respective extra port on the selected design block for each of the at least one internal signal in response to the selecting of the at least one internal signal;
  means for automatically generating a hardware realization of the design block;
  wherein the hardware realization of the design block includes each respective extra port and the plurality of ports of the design block;
  means for mapping each extra port and each of the ports of the design block to corresponding locations in a memory of a hardware-based co-simulation platform, wherein the memory is external to the hardware realization of the design block;
  means for connecting the memory location corresponding to each respective extra port and each of the ports of the design block to a signal monitor on a software-based co-simulation platform via a software signal;
  means for simulating the electronic system in the HLMS, the HLMS including the hardware-based co-simulation platform and the software-based co-simulation platform, wherein the simulating of the electronic system includes emulating the design block using the hardware realization of the design block;
  wherein the co-simulation block is included in the software based co-simulation platform;
  wherein the means for simulating further includes:
    means for writing by the hardware realization of the design block, a respective first sequence of values to a corresponding location in the memory and a respective second sequence of values to a corresponding location in the memory, the respective first sequence of values representative of the at least one internal signal, and the respective second sequence of values representative of a signal of a port of the design block;
    means for reading by the co-simulation block the respective first sequence of values from the corresponding locations in the memory; and
  means for displaying the respective first sequence of values by the signal monitor.

* * * * *